(12) United States Patent
Kim

(10) Patent No.: US 12,256,327 B2
(45) Date of Patent: Mar. 18, 2025

(54) ELECTRONIC DEVICE FOR PERFORMING CONDITIONAL HANDOVER AND METHOD OF OPERATING THE SAME

(71) Applicant: SAMSUNG ELECTRONICS CO., LTD., Suwon-si (KR)

(72) Inventor: Hyeonsoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 17/850,551

(22) Filed: Jun. 27, 2022

(65) Prior Publication Data
US 2023/0029410 A1 Jan. 26, 2023

Related U.S. Application Data

(63) Continuation of application No. PCT/KR2022/005219, filed on Apr. 11, 2022.

(30) Foreign Application Priority Data

Jul. 15, 2021 (KR) .................. 10-2021-0093080

(51) Int. Cl.
*H04W 48/20* (2009.01)
*H04W 36/00* (2009.01)
(Continued)

(52) U.S. Cl.
CPC ......... *H04W 48/20* (2013.01); *H04W 36/362* (2023.05); *H04W 76/27* (2018.02); *H04W 36/00835* (2018.08); *H04W 36/087* (2023.05)

(58) Field of Classification Search
CPC ............. H04W 36/0061; H04W 36/38; H04W 36/00835; H04W 36/322; H04W 36/324; H04W 36/08
See application file for complete search history.

(56) References Cited

U.S. PATENT DOCUMENTS

| 9,622,124 B2 * | 4/2017 | Hamilton | ........ H04W 36/00835 |
| 2016/0014648 A1 * | 1/2016 | Hamilton | .......... H04W 36/0061 |
| | | | 455/436 |

(Continued)

FOREIGN PATENT DOCUMENTS

| EP | 3322223 | 5/2018 |
| KR | 10-2018-0045727 | 5/2018 |

(Continued)

OTHER PUBLICATIONS

"3GPP TS 38.331", 3rd Generation Partnership Project; Technical Specification Group Radio Access Network; NR; Radio Resource Control (RRC) protocol specification, Version 16.7.0, Release 16, Dec. 2021, 963 pages.

(Continued)

*Primary Examiner* — Mahran Y Abu Roumi
(74) *Attorney, Agent, or Firm* — NIXON & VANDERHYE P.C.

(57) ABSTRACT

In an electronic device and a method of operating an electronic device according to various embodiments, the electronic device includes a memory; a communication circuit configured to transmit and receive data to and from a network; and a communication processor, wherein the communication processor is configured to: identify information on nodes adjacent to the electronic device included in a radio resource control (RRC) reconfiguration message received from the network; identify at least one node satisfying a specified condition among the nodes; and select a node to connect based on a table generated based on information on nodes satisfying the specified condition and a type of a service used by the electronic device.

20 Claims, 8 Drawing Sheets

(51) Int. Cl.
   *H04W 36/08*    (2009.01)
   *H04W 36/36*    (2009.01)
   *H04W 76/27*    (2018.01)

(56) References Cited

U.S. PATENT DOCUMENTS

| | | |
|---|---|---|
| 2018/0279193 A1 | 9/2018 | Park et al. |
| 2018/0343608 A1 | 11/2018 | Duan et al. |
| 2019/0223057 A1 | 7/2019 | Park et al. |
| 2019/0357064 A1 | 11/2019 | Hosseini et al. |
| 2019/0387440 A1 | 12/2019 | Yiu et al. |
| 2020/0413308 A1 | 12/2020 | Hwang et al. |
| 2021/0112435 A1 | 4/2021 | Zheng et al. |
| 2022/0070752 A1 | 3/2022 | Kim et al. |
| 2022/0256409 A1* | 8/2022 | Hanada ................. H04W 36/08 |
| 2022/0279394 A1 | 9/2022 | Gao et al. |

FOREIGN PATENT DOCUMENTS

| | | |
|---|---|---|
| KR | 10-2159998 | 9/2020 |
| WO | 2020/149650 | 7/2020 |
| WO | 2020/255490 | 12/2020 |
| WO | 2020/263028 | 12/2020 |
| WO | 2021/092810 | 5/2021 |

OTHER PUBLICATIONS

Search Report and Written Opinion dated Jul. 13, 2022 issued in International Patent Application No. PCT/ KR2022/005219.
Extended European Search Report for EP Application No. 22842241.6 dated Sep. 17, 2024, 11 pages.

* cited by examiner

ELECTRONIC DEVICE FOR PERFORMING CONDITIONAL HANDOVER AND METHOD OF OPERATING THE SAME

CROSS-REFERENCE TO RELATED APPLICATIONS

This application is a continuation of International Application No. PCT/KR2022/005219 designating the United States, filed on Apr. 11, 2022, in the Korean Intellectual Property Receiving Office and claiming priority to Korean Patent Application No. 10-2021-0093080, filed on Jul. 15, 2021, in the Korean Intellectual Property Office, the disclosures of which are incorporated by reference herein in their entireties.

BACKGROUND

Field

The disclosure to an electronic device and a method of operating the electronic device, and for example, to an electronic device for performing conditional handover and a method of operating the electronic device.

Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 6 GHz band or more) in addition to bands used by LTE (bands of 6 GHz or less). The technologies of beamforming, massive multiple input and multiple output (MIMO), full dimensional MIMO (FD-MIMO), array antenna, analog beamforming, and large scale antenna are being discussed for the 5G communication system.

An electronic device may be connected to a network through a node, transmit data to an external electronic device through cellular communication, or receive data transmitted by the external electronic device. The electronic device may perform handover for changing a connected node. Conditional handover may refer, for example, to handover to be performed when a handover execution condition is satisfied. The electronic device may evaluate whether a handover execution condition is satisfied and perform a connection to a node satisfying the handover execution condition corresponding to satisfying the handover execution condition.

When there are a plurality of nodes satisfying a conditional handover execution condition, the electronic device may select a node to perform handover among the plurality of nodes. In TS 38.311 of 3GPP, when there are a plurality of nodes satisfying the execution condition, it is described that selecting a node to perform handover among the plurality of nodes is an implementation matter of the electronic device, and specific details of selecting a node are not defined.

When a node is selected and handover is performed to the selected node without considering characteristics of a service used by the electronic device, the selected node may not have a performance to improve a quality of a service used by the electronic device. When a connection is performed to a node that cannot improve a quality of the service used by the electronic device, a phenomenon in which the service quality of the electronic device is deteriorated may occur.

SUMMARY

According to various example embodiments of the disclosure, an electronic device includes: a memory; a communication circuit configured to transmit and receive data to and from a network; and a communication processor, wherein the communication processor is configured to: identify information on nodes adjacent to the electronic device included in a radio resource control (RRC) reconfiguration message received from the network; identify at least one node satisfying a specified condition among the nodes; and select a node to connect based on a table generated based on information on nodes satisfying the specified condition and a type of a service used by the electronic device.

According to various example embodiments of the disclosure, an electronic device includes: a memory; a communication circuit configured to transmit and receive data to and from a network; and a communication processor, wherein the communication processor is configured to: identify information on nodes adjacent to the electronic device included in a radio resource control (RRC) reconfiguration message received from the network; identify at least one node satisfying a specified condition among the nodes; identify whether a quality of a signal transmitted by a first node among the nodes is higher by a specified magnitude or more than a quality of signals transmitted by other nodes; perform a connection between the first node and the electronic device based on identifying that a quality of a signal transmitted by the first node is higher by a specified magnitude or more than a quality of signals transmitted by other nodes; and; select a node to connect based on a table generated based on information on nodes satisfying the specified condition and a type of a service used by the electronic device based on a quality of a signal transmitted by the first node being less by a specified magnitude than a quality of signals transmitted by other nodes.

According to various example embodiments of the disclosure, a method of operating an electronic device includes: identifying information on nodes adjacent to the electronic device included in a radio resource control (RRC) reconfiguration message received from a network; identifying at least one node satisfying a specified condition among the nodes; and selecting a node to connect based on a table generated based on information on nodes satisfying the specified condition and a type of a service used by the electronic device.

An electronic device and a method of operating the electronic device according to various example embodiments of the disclosure can select a node to perform connection (or handover) based on a table generated based on a type of a service used by the electronic device and information on a plurality of nodes included in an RRC reconfiguration message. Accordingly, by selecting and connecting a node to perform handover based on a type of a service used by the electronic device, the electronic device can improve a quality of the service used by itself.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
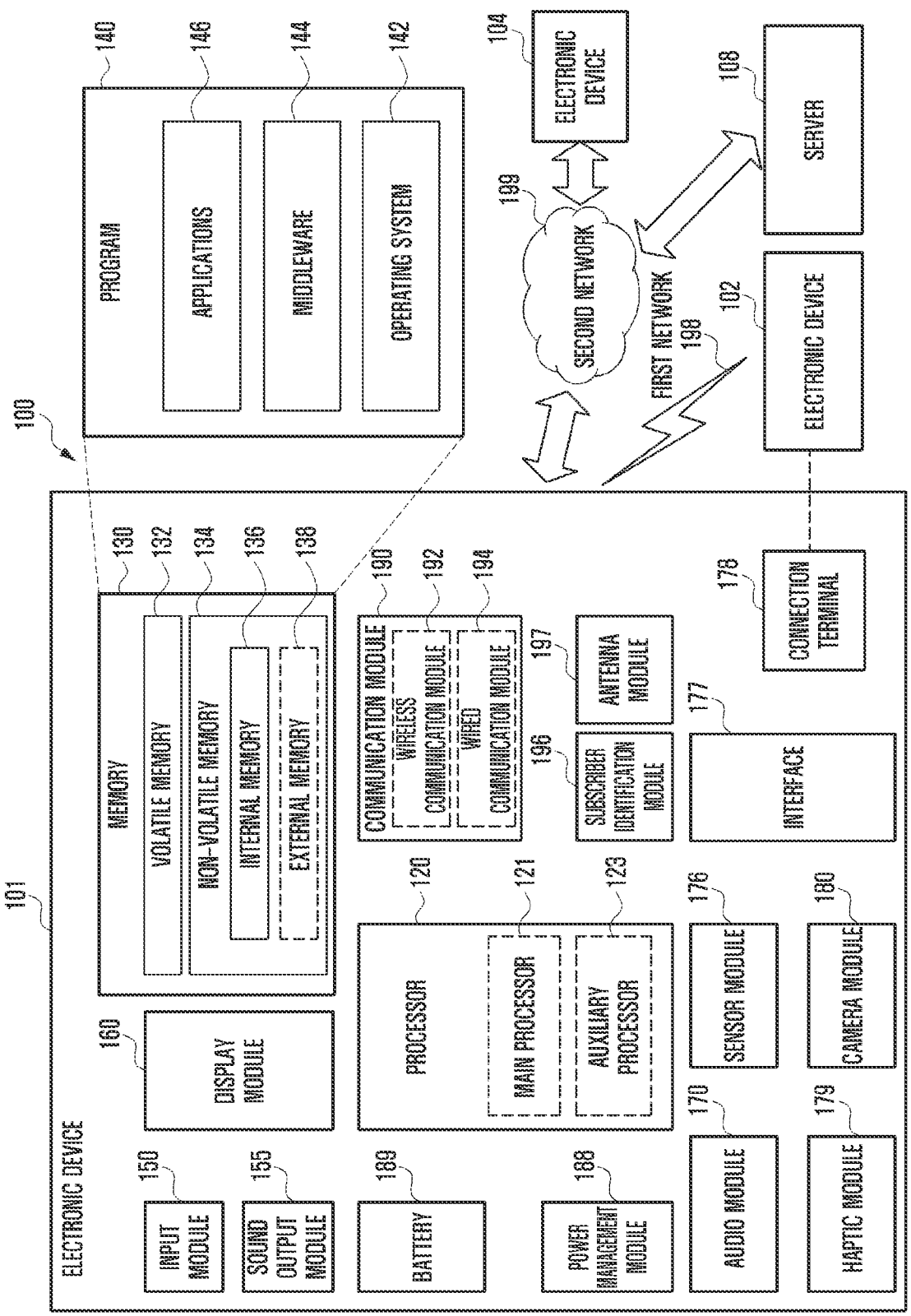
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
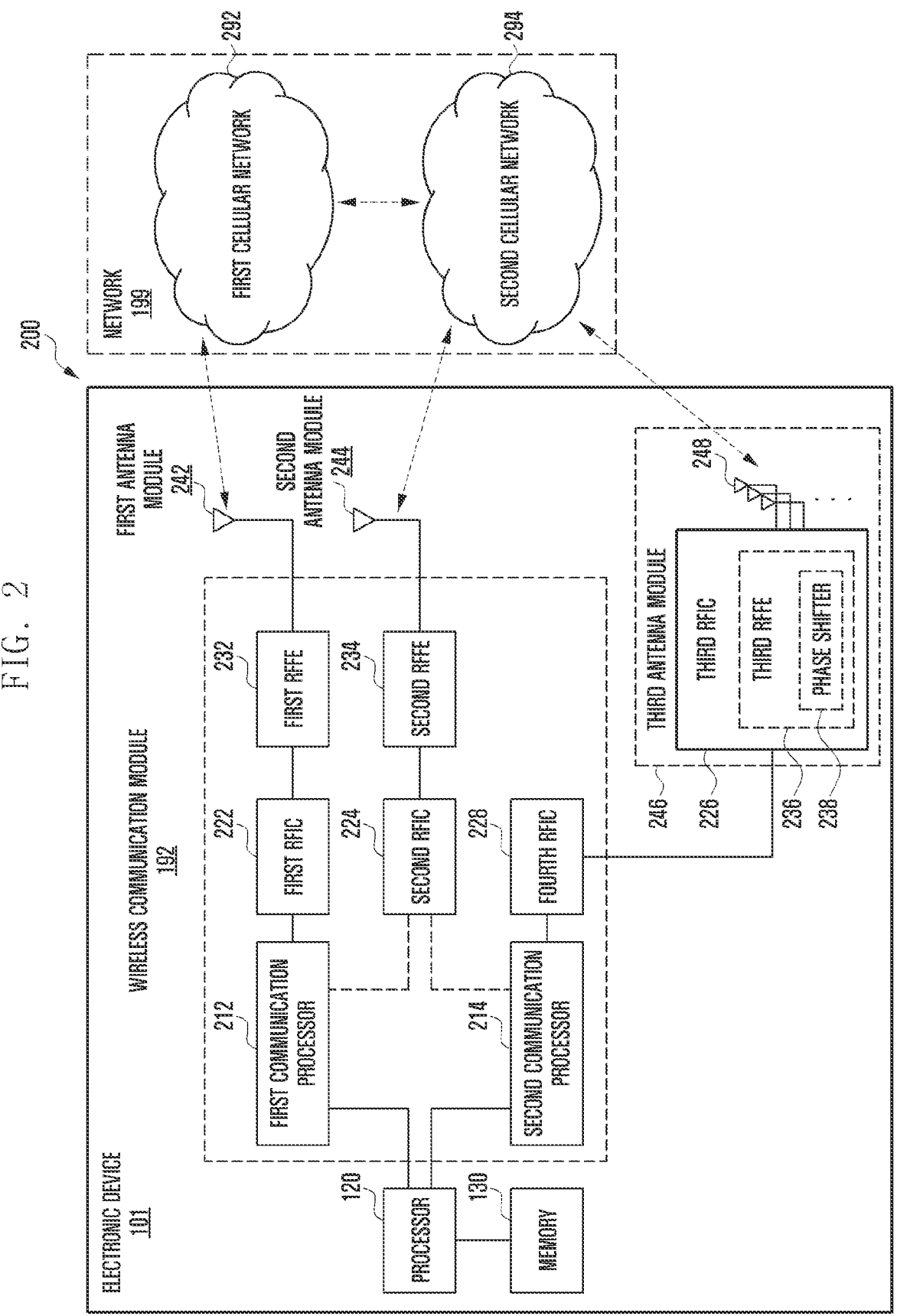
FIG. 2 is a block diagram illustrating an example configuration of an electronic device for supporting legacy network communication and 5G network communication according to various embodiments.

FIG. 2 is a block diagram illustrating an example configuration of an electronic device in a network environment including a plurality of cellular networks according to various embodiments.

Referring to FIG. 2, the electronic device 101 may include a first communication processor (e.g., including communication processing circuitry) 212, second communication processor (e.g., including communication processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor (e.g., including processing circuitry) 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may include various communication processing circuitry and establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
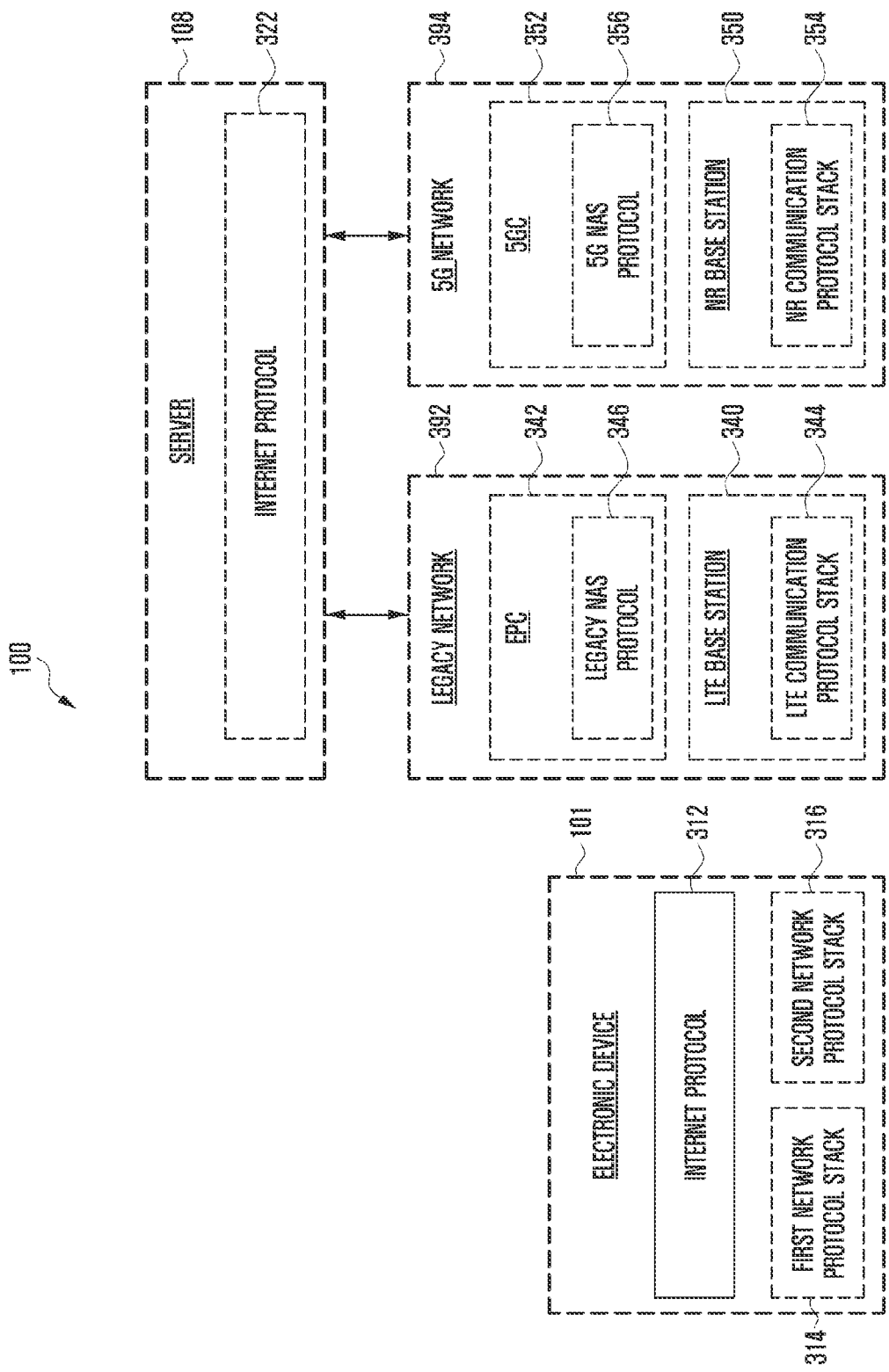
FIG. 3 is a block diagram illustrating an example protocol stack structure of a network of legacy communication and/or 5G communication according to various embodiments.

FIG. 3 is a block diagram illustrating an example protocol stack structure of the network 100 of legacy communication and/or 5G communication according to various embodiments.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to an embodiment, the electronic device 101 may perform wireless communication with the legacy network 392 through the first communication protocol stack 314. According to an embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to an embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4:
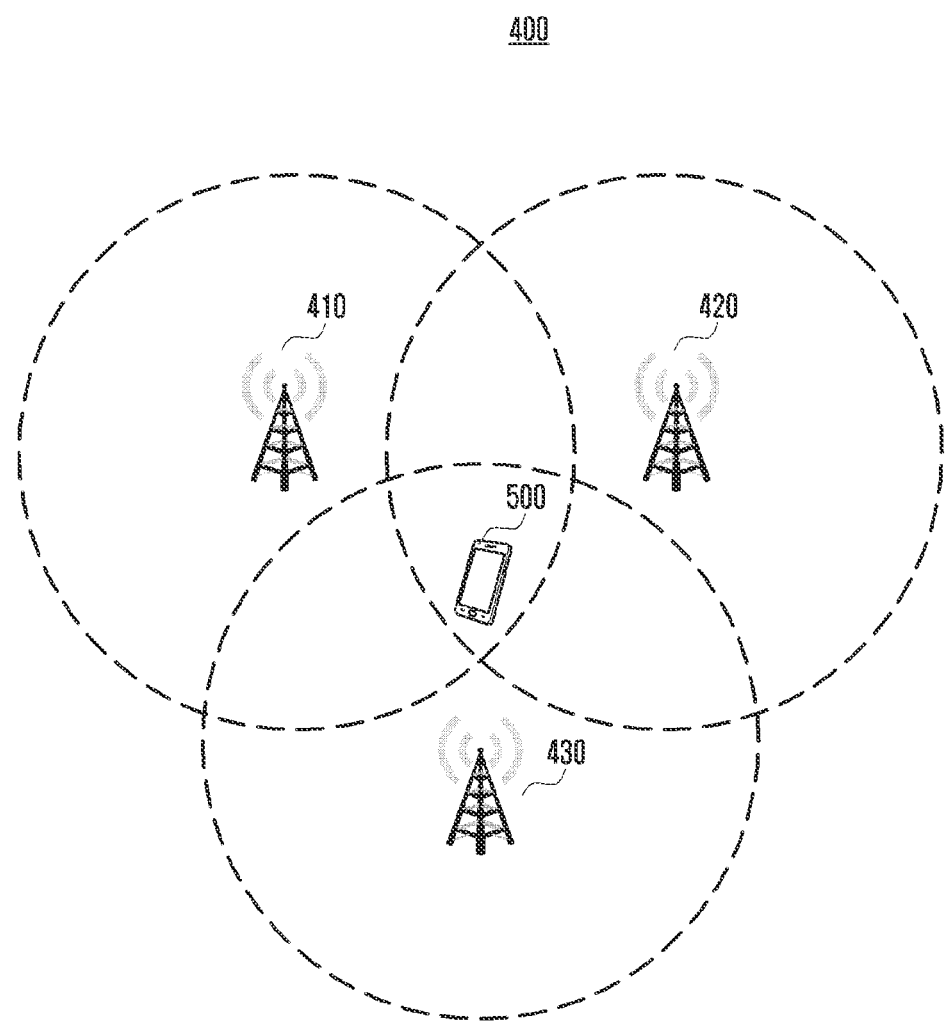
FIG. 4 is a diagram illustrating an electronic device and a cellular network according to various embodiments.

FIG. 4 is a diagram illustrating an electronic device and a cellular network according to various embodiments.

According to various embodiments of the disclosure, a cellular network 400 may include a first node (e.g., the NR gNB 350 of FIG. 3) 410, a second node (e.g., NR gNB 350 of FIG. 3) 420, and/or a third node (e.g., the NR gNB 350 of FIG. 3) 430.

According to various embodiments of the disclosure, the first node 410 may be a base station supporting first cellular communication. The first cellular communication may refer, for example, to any one of various cellular communication methods that may be supported by the electronic device 500, for example, a communication method on the second cellular network 294 of FIG. 2. For example, the first cellular communication may be any one of 5G mobile communication methods (e.g., a communication method using FR1, which is a band of 6 GHz or less, or a communication method using FR2, which is a frequency band of 6 GHz or higher). According to an embodiment, the first node 410 may be a node that outputs a signal of a first frequency band (e.g., a frequency band of 6 GHz or higher).

According to various embodiments of the disclosure, the second node 420 may be a base station supporting the first cellular communication. The third node 430 may be a base station supporting the first cellular communication. For convenience of description, it is assumed that the electronic device 500 is in a state connected to the first node 410.

The electronic device 500 may change a connected node for various reasons. According to an embodiment, the electronic device 500 may receive a radio resource control (RRC) reconfiguration message in a state connected to the first node 410.

The RRC reconfiguration message may include information on a node adjacent to the electronic device 500 (or a node adjacent to the first node 410) (e.g., the second node 420 and/or the third node 430). Information on the node adjacent to the electronic device 500 may include conditional handover information. The conditional handover information may include information related to a measurement object (measObject) related to the second node 420 and/or the third node 430, which are/is a node adjacent to the electronic device 500 (or adjacent to the first node 410) and/or information related to a specified condition (or report object) of the measurement result. The measurement object may include information required for the electronic device 500 to perform measurement and may include frequency band information (e.g., channel information) for performing a node search and quality measurement of the found node and/or identification information (e.g., physical cell ID) of a node that outputs a signal of a frequency band included in frequency band information. The specified condition may include a condition for reporting the measured quality and may include identification information of an event related to quality reporting (e.g., A3 event, which may be a condition in which signal strength of an adjacent node is greater by a specific value or more than that of a connected node, A5 event, which may be a condition in which signal strength of a connected node is smaller than a specified magnitude and in which signal strength of an adjacent node is greater than a specified magnitude), a specified threshold related to a quality of the signal transmitted by the node, and/or a time to trigger (TTT) satisfaction of a condition related to a quality.

According to various embodiments of the disclosure, in a state in which the electronic device 500 is connected to the first node 410, the electronic device 500 may measure a quality of a signal transmitted by the second node 420 and/or a quality of a signal transmitted by the third node 430 based on node identification information included in the conditional handover information.

After completing a node search based on the node identification information, the electronic device 500 may measure a quality of the found node. The electronic device 500 may measure a quality (e.g., reference signal received power (RSRP) or reference signal received quality (RSRQ)) of a signal broadcasted by the found node, and when the measurement result satisfies a specified condition, the electronic device 500 may transmit a report message including the measurement result to a connected node. The report message may include identification information (e.g., physical cell ID) of the measured node and/or identification information on information (e.g., synchronization signal block (SSB)) included in the signal transmitted by the measured node as the quality measurement result.

Corresponding to the measured quality satisfying a specified condition included in the conditional handover information, the electronic device 500 may release a connection with the first node 410 and perform (or handover) a connection with a node satisfying the condition. Corresponding to the measured quality satisfying a specified condition included in the conditional handover information, the electronic device 500 may perform (or handover) a connection with a node satisfying the specified condition without transmitting a report message including the measurement result to the connected node.

According to various embodiments of the disclosure, there may be a plurality of nodes satisfying a specified condition included in the conditional handover information. In 3GPP TS. 38. 311, when there are a plurality of nodes satisfying a specified condition, a method of selecting a node to perform handover among the plurality of nodes is described as an implementation matter of the electronic device 500, and a specific selection method is not disclosed. Hereinafter, according to an example embodiment, an operation in which the electronic device 500 may be connected to a node capable of improving a quality of first communication through conditional handover will be described in greater detail.

Figure 5:
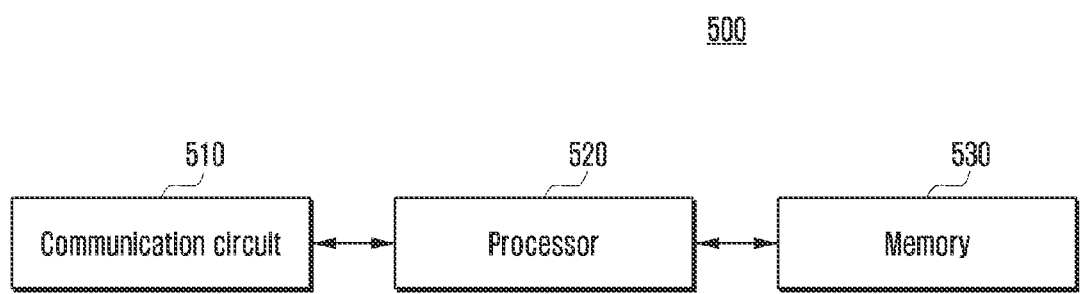
FIG. 5 is a block diagram illustrating an example configuration of an electronic device according to various embodiments.

FIG. 5 is a block diagram illustrating an example configuration of an electronic device according to various embodiments.

Referring to FIG. 5, an electronic device (e.g., the electronic device 101 of FIG. 1) 500 according to various embodiments of the disclosure may include a communication circuit (e.g., the wireless communication module of FIG. 1) 510, a processor (e.g., including processing circuitry, e.g., the processor 120 of FIG. 1, the first communication processor 212 of FIG. 2, and/or the second communication processor 242 of FIG. 2) 520, and/or a memory (e.g., the memory 130 of FIG. 1) 530.

The processor 520 may be operatively connected to the communication circuit 510 and/or the memory 530. The processor 520 may include various processing circuitry control components of the electronic device 500. For example, the processor 520 may control components of the electronic device 500 according to one or more instructions stored in the memory 530.

The communication circuit 510 may provide communication with an external electronic device (e.g., the external electronic device 104 of FIG. 1) to the electronic device 500 through at least one network (e.g., the legacy network 392 or the 5G network 394 of FIG. 3). For example, the communication circuit 510 may support communication between the electronic device 500 and the external electronic device 104 through the first node (e.g., the first node 410 of FIG. 4), the second node (e.g., the second node 420 of FIG. 4), and/or the third node (e.g., the third node 430 of FIG. 4) based on the control of the communication processor 520.

The processor 520 may include various processing circuitry and control the communication circuit 510 to perform a connection procedure with a specific node (e.g., the first node 410) in order to perform first communication. The processor 520 may receive an RRC reconfiguration message from the first node 410 during a connection operation with the first node 410 or in a state connected to the first node 410.

The RRC reconfiguration message may include information on a node adjacent to the electronic device 500 (or a node adjacent to the first node 410) (e.g., the second node 420 and/or the third node 430). Information on the node adjacent to the electronic device 500 may include conditional handover information. The conditional handover information may include information related to a measurement object (measObject) related to the second node 420 and/or the third node 430, which are/is a node adjacent to the electronic device 500 (or adjacent to the first node 410) and/or information related to a specified condition (or report object) of the measurement result. The measurement object is information required for the electronic device 500 to perform measurement, and may include frequency band information (e.g., channel information) for performing a node search and quality measurement of the found node and/or identification information (e.g., physical cell ID) of a node that outputs a signal of a frequency band included in frequency band information. The specified condition is a condition for reporting the measured quality and may include identification information on an event related to quality reporting (e.g., A3 event, which is a condition in which signal strength of an adjacent node is greater by a specific value or more than that of a connected node, A5 event, which is a condition in which signal strength of a connected node is smaller than a specified magnitude and in which signal strength of an adjacent node is greater than a specified magnitude), a specified threshold related to a quality of the signal transmitted by the node, and/or a time to trigger (TTT) satisfaction of a condition related to the quality.

In a state in which the electronic device 500 is connected to the first node 410, the processor 520 may measure a quality of a signal transmitted by a node (e.g., the second node 420 and/or the third node 430) adjacent to the electronic device 500 included in the conditional handover information and identify whether the measured signal quality satisfies a specified condition. The processor 520 may measure a quality of a signal using the communication circuit 510 capable of both transmitting and receiving a signal in order to increase a headroom of a signal output by the electronic device 500.

According to an embodiment, the processor 520 may control the communication circuit 510 to receive a signal transmitted (or broadcasted) by the second node 420 and to measure a quality of the signal based on identification information of the second node 420 included in the conditional handover information. The processor 520 may identify whether the signal quality of the second node 420 satisfies a specified condition. The specified condition may be included in the conditional handover information. For example, the processor 520 may determine that the signal quality of the second node 420 satisfies a specified condition (e.g., A3 event) corresponding to identifying that the signal quality of the second node 420 is greater by a specified magnitude (e.g., A3 offset) or more than signal strength of the connected node (e.g., the first node 410). For another example, corresponding to identifying that the signal quality of the connected node (e.g., the first node 410) is equal to or less than a specified value (e.g., A5 threshold 1) and that the signal quality of the second node 420 is greater than or equal to a specified value (e.g., A5 threshold 2), the processor 520 may determine that the signal quality of the second node 420 satisfies a specified condition (e.g., A5 event).

According to an embodiment, the processor 520 may control the communication circuit 510 to receive a signal transmitted (or broadcasted) by the third node 430 and to measure a signal quality based on identification information of the third node 430 included in the conditional handover information. The processor 520 may identify whether the signal quality of the third node 430 satisfies a specified condition. The specified condition may be included in the conditional handover information. For example, corresponding to identifying that the signal quality of the third node 430 is greater by a specified magnitude (e.g., A3 offset) or more than signal strength of the connected node (e.g., the first node 410), the processor 520 may determine that the signal quality of the third node 430 satisfies a specified condition (e.g., A3 event). For another example, corresponding to identifying that the signal quality of the connected node (e.g., the first node 410) is equal to or less than a specified value (e.g., A5 threshold 1) and that the signal quality of the third node 430 is greater than or equal to a specified value (e.g., A5 threshold 2), the processor 520 may determine that the signal quality of the third node 430 satisfies a specified condition (e.g., A5 event).

There may be a plurality of nodes satisfying a specified condition included in the conditional handover information. The processor 520 may generate a table based on information on nodes satisfying a specified condition and a type of a service used by the electronic device 500. The table may include data used for determining a node to perform handover.

Information on nodes may be included in conditional handover information, and include information related to a node performance. For example, the node information may refer, for example, to information indicating whether the second node 420 and/or the third node 430 support(s) dynamic spectrum sharing (DSS), information (band information) indicating a frequency band of a signal transmitted and/or received by the second node 420 and/or the third node 430, information indicating the maximum modulation order supported by the second node 420 and/or the third node 430, the number of maximum multiple input multi output (MIMO) layers supported by the second node 420 and/or the third node 430, information indicating a magnitude of a time allocation resource of a physical downlink shared channel (PDSCH) of the second node 420 and/or the third node 430, and information indicating whether the second node 420 and/or the third node 430 support(s) carrier aggregation (CA) or dual connectivity (e.g., EN-DC, NR-DC).

When generating a table, the processor 520 may generate a table differently according to a type of a service being used by the electronic device 500. The processor 520 may select information to be included in the table among node information according to a type of a service being used by the electronic device 500, and generate a table based on the selected information. When selecting information to be included in the table, the processor 520 may select information capable of improving a quality of the service being used. The processor 520 may generate a table with reference to information to which a type of a service stored in the memory 530 and information required to generate a table are mapped. The mapped information may be implemented in the form illustrated in Table 1. Information to be included in the table may include information for improving a quality of the service used by the electronic device 500. The processor 520 may identify whether the second node 420 and/or the third node 430 support(s) higher order received diversity (HoRXD) based on information (band information) indicating a frequency band of a signal transmitted and/or received by the second node 420 and/or the third node 430 included in the information on the nodes. The processor 520 may identify whether the second node 420 and/or the third node 430 support(s) HoRXD based on data to which a frequency band stored in the memory 530 and whether HoRXD is supported are mapped.

TABLE 1

| Service type | Information to be selected |
|---|---|
| VoNR | Information indicating whether DSS is supported |
| | Information indicating whether HoRXD is supported |
| Data transfer (eMBB) | Information indicating whether DSS is supported |
| | Modulation order information |
| | Information indicating the number of maximum MIMO layers |

According to an embodiment, corresponding to identifying that a service currently being used is voice over NR (VoNR), the processor 520 may select information indicating whether DSS is supported and/or information indicating whether HoRXD is supported among information on nodes as data to be included in the table and generate a table. The table generated by the processor 520 may be implemented, as illustrated in Table 2.

TABLE 2

| Nodes satisfying a specified condition | Information indicating whether DSS is supported | Information indicating whether HoRXD is supported |
|---|---|---|
| Second node 420 | Supported | Supported |
| Third node 430 | Not supported | Not supported |

Information to be included in the table may include information for improving a quality of a service used by the electronic device 500. DSS may include technology that may be dynamically changed in a state in which a frequency band allocated to first cellular communication and a frequency band allocated to second cellular communication are at least partially overlapped or included, and in the electronic device 500 performing first cellular communication through a node supporting DSS, a quality of first cellular communication may be deteriorated due to interference by a signal of second cellular communication. When the electronic device 500 is connected to a node (e.g., the third node 430) that does not support DSS, it is possible to guarantee a relatively high quality of service, compared with when the electronic device 500 is connected to a node (e.g., the second node 420) that supports DSS. HoRxD may refer, for example, to a diversity reception method capable of exhibiting a high performance when performing diversity reception. A situation in which the electronic device 500 is connected to a node supporting HoRxD (e.g., the second node 420) may guarantee a higher quality of service, compared with a situation in which the electronic device 500 is connected to a node that does not support HoRxD (e.g., the third node 430).

According to an embodiment, corresponding to identifying that a service currently being used is eMBB, the processor 520 may select information indicating whether DSS is supported, modulation order information, and/or information indicating the number of maximum MIMO layers among information on nodes as data to be included in the table and generate a table. The table generated by the processor 520 may be implemented, as illustrated in Table 3.

TABLE 3

| Nodes satisfying a specified condition | Information indicating whether DSS is supported | Modulation order information | Number of maximum MIMO layers |
| --- | --- | --- | --- |
| Second node 420 | Not supported | 256QAM | 4 |
| Third node 430 | Supported | 64QAM | 2 |

Information to be included in the table may include information for improving a quality of a service used by the electronic device 500. DSS may include technology in which a frequency band allocated to first cellular communication and a frequency band allocated to second cellular communication may be dynamically changed, and in the electronic device 500 performing first cellular communication through a node supporting DSS, a quality of the first cellular communication may be deteriorated due to interference by a signal of second cellular communication. When the electronic device 500 is connected to a node that does not support DSS (e.g., the third node 430), it is possible to guarantee a relatively high quality of service, compared with when the electronic device 500 is connected to a node that supports DSS (e.g., the second node 420). The modulation order information may include a maximum value of a modulation order of a data modulation execution method (e.g., quadrature amplitude modulation (QAM)). The higher a modulation order, the higher a data rate may be. When the electronic device 500 is connected to a node supporting a higher modulation order (e.g., the second node 420), a relatively high transmission rate may be guaranteed, compared with when the electronic device is connected to a node (e.g., the third node 430) supporting a lower modulation order. The number of maximum MIMO layers is the number of layers supported to the maximum by the second node 420 and/or the third node 430, and layers may refer, for example, to the number of simultaneously transmittable signals. A situation in which the electronic device 500 is connected to a node (e.g., the second node 420) having the higher maximum number of layers may guarantee a relatively high transmission rate, compared with a situation in which the electronic device 500 is connected to a node (e.g., the third node 430) having the relatively low number of layers.

According to an embodiment, the processor 520 may identify the number of reception bands supported by the second node 420 and/or the third node 430 based on information (band information) indicating a frequency band of a signal transmitted and/or received by the second node 420 and/or the third node 430 included in information on nodes. Corresponding to identifying that a service currently being used is a service requiring a high reception speed, the processor 520 may select the number of reception bands of the second node 420 and/or the third node 430 as data to be included in the table and generate a table. The table generated by the processor 520 may be implemented, as illustrated in Table 4.

TABLE 4

| Nodes satisfying a specified condition | Receiving bands and number of receiving bands |
| --- | --- |
| Second node 420 | N66-4RX |
| Third node 430 | N71-2RX |

Information to be included in the table may include information for improving a quality of a service used by the electronic device 500. As the number of reception bands increases, the electronic device 500 may implement a high reception speed. A situation in which the electronic device 500 is connected to a node (e.g., the second node 420) having the relatively large number (e.g., 4) of reception bands may guarantee a higher quality of service, compared with a situation in which the electronic device 500 is connected to a node (e.g., the third node 430) having the number (e.g., 2) of relatively small reception bands.

The table generation method described above is an example, and other information on a node may be included in the table. For example, the processor 520 may include information indicating a magnitude of a time allocation resource of the PDSCH in the table. The magnitude of the time allocation resource of the PDSCH may be implemented in units of symbols. For example, the magnitude of the time allocation resource of the PDSCH may include the number of symbols that may be allocated to the PDSCH among 14 symbols corresponding to one subframe. As the magnitude of the time allocation resource of the PDSCH increases, the magnitude of data that may be transmitted through the PDSCH increases. Thus, a throughput performance of data may be improved. As another example, the processor 520 may include information indicating whether the second node 420 and/or the third node 430 support(s) CA or whether dual connectivity is supported in the table. When the electronic device 500 is handed over to a node that does not support CA or dual connectivity in a state in which the electronic device 500 is connected to a node supporting CA or dual connectivity, the electronic device 500 uses a smaller bandwidth than a bandwidth (e.g., total bandwidth) used before handover; thus, data throughput may be reduced, and as the electronic device 500 performs handover to another node supporting CA or dual connectivity, data throughput may be improved.

The processor 520 may determine (or select) a node to perform handover based on a table generated based on information on nodes and a service type.

The processor 520 may determine a node to perform handover with reference to the table illustrated in Table 2. The processor 520 may determine a node to perform handover based on a priority (or weight) of information included in the table.

Referring to Table 2, information included in the table (whether DSS is supported or whether HoRXD is supported) may have different priorities. Whether DSS is supported may have a higher priority than whether HoRxD is supported. The processor 520 may determine the third node 430 that does not support DSS as a node to perform handover based on information (e.g., whether DSS is supported) corresponding to a high priority among information included in the table. Whether HoRxD is supported may have a higher priority than whether DSS is supported. The processor 520 may determine the second node 420 supporting HoRxD as a node to perform handover based on information (e.g., whether HoRxD is supported) corresponding to a high priority among information included in the table.

For another example, information included in the table (whether DSS is supported or whether HoRXD is supported) may have different weights. Whether DSS is supported may have a higher weight than whether HoRxD is supported (e.g., whether DSS is supported: 0.7, whether HoRxD is supported: 0.3). The processor 520 may determine a node to perform handover based on information and weights included in the table. The processor 520 may determine the third node 430 that does not support DSS as a node to perform handover.

The processor 520 may determine a node to perform handover with reference to the table illustrated in Table 3. The processor 520 may determine a node to perform handover based on a priority (or weight) of information included in the table.

With reference to Table 3, information included in the table (whether DSS is supported, modulation order information, number of maximum MIMO layers) may have different priorities. Whether DSS is supported may have a higher priority than that of the maximum modulation order, and the maximum modulation order may have a higher priority than that of the maximum MIMO layer. The processor 520 may determine the third node 430 that does not support DSS as a node to perform handover based on information (e.g., whether DSS is supported) corresponding to a high priority among information included in the table. The priority may be configured differently according to a type of a service.

For another example, information included in the table (whether DSS is supported, modulation order information, and the number of maximum MIMO layers) may have different weights. Whether DSS is supported may have a higher weight than that of the maximum modulation order information (e.g., whether DSS is supported: 0.6, maximum modulation order: 0.3), and the maximum modulation order information may have a higher weight than that of the number of maximum MIMO layers (e.g., maximum modulation order: 0.3, the number of maximum MIMO layers: 0.1). The processor 520 may determine a node to perform handover based on information and weights included in the table. The processor 520 may determine the third node 430 as a node to perform handover.

The processor 520 may not determine a node to perform handover with reference to the table. For example, the processor 520 may identify that the second node 420 and the third node 430 have the same performance with reference to the table. The processor 520 may add additional information to the table to determine a node to perform conditional handover. For example, when the processor 520 does not determine a node to perform conditional handover with reference to a table corresponding to Table 3, the processor 520 may add additional information to the table. The table updated by the processor 520 may be implemented, as illustrated in Table 5.

TABLE 5

| Nodes satisfying a specified condition | Information indicating whether DSS is supported | Modulation order information | Number of maximum MIMO layers | Receiving bands and number of receiving bands |
|---|---|---|---|---|
| Second node 420 | Not supported | 256QAM | 4 | N66-4RX |
| Third node 430 | Not supported | 256QAM | 4 | N71-2RX |

The processor 520 may determine a node to perform conditional handover using the updated table. A situation in which the electronic device 500 is connected to a node (e.g., the second node 420) having the relatively large number (e.g., 4) of reception bands may guarantee a higher quality of service, compared with a situation in which the electronic device 500 is connected to a node (e.g., the third node 430) having the relatively small number (e.g., 2) of reception bands. The processor 520 may determine the second node 420, which is a node having the relatively large number of reception bands as a node to perform conditional handover.

The processor 520 may determine a node to perform conditional handover based on a signal quality without generating a table. The processor 520 may measure a signal quality of nodes adjacent to the electronic device 500, and when the measured quality condition satisfies a specified condition, the processor 520 may determine a node satisfying the specified condition as a node to perform handover. For example, the processor 520 may measure a signal quality of a plurality of nodes, and determine a node having the best signal quality as a node to perform handover corresponding to identifying that a signal quality of one of the plurality of nodes is greater by a specified magnitude (e.g., 3 dB) or more than a signal quality of the other node.

The processor 520 may perform a connection with the determined node corresponding to determining a node to perform handover.

The processor 520 may update (or re-generate) the table according to a change in a service being used by the electronic device 500. The processor 520 may generate a table based on the changed service type and information on nodes included in the RRC reconfiguration message received from the hand-over node and again select a node to perform conditional handover based on the table.

Figure 6:
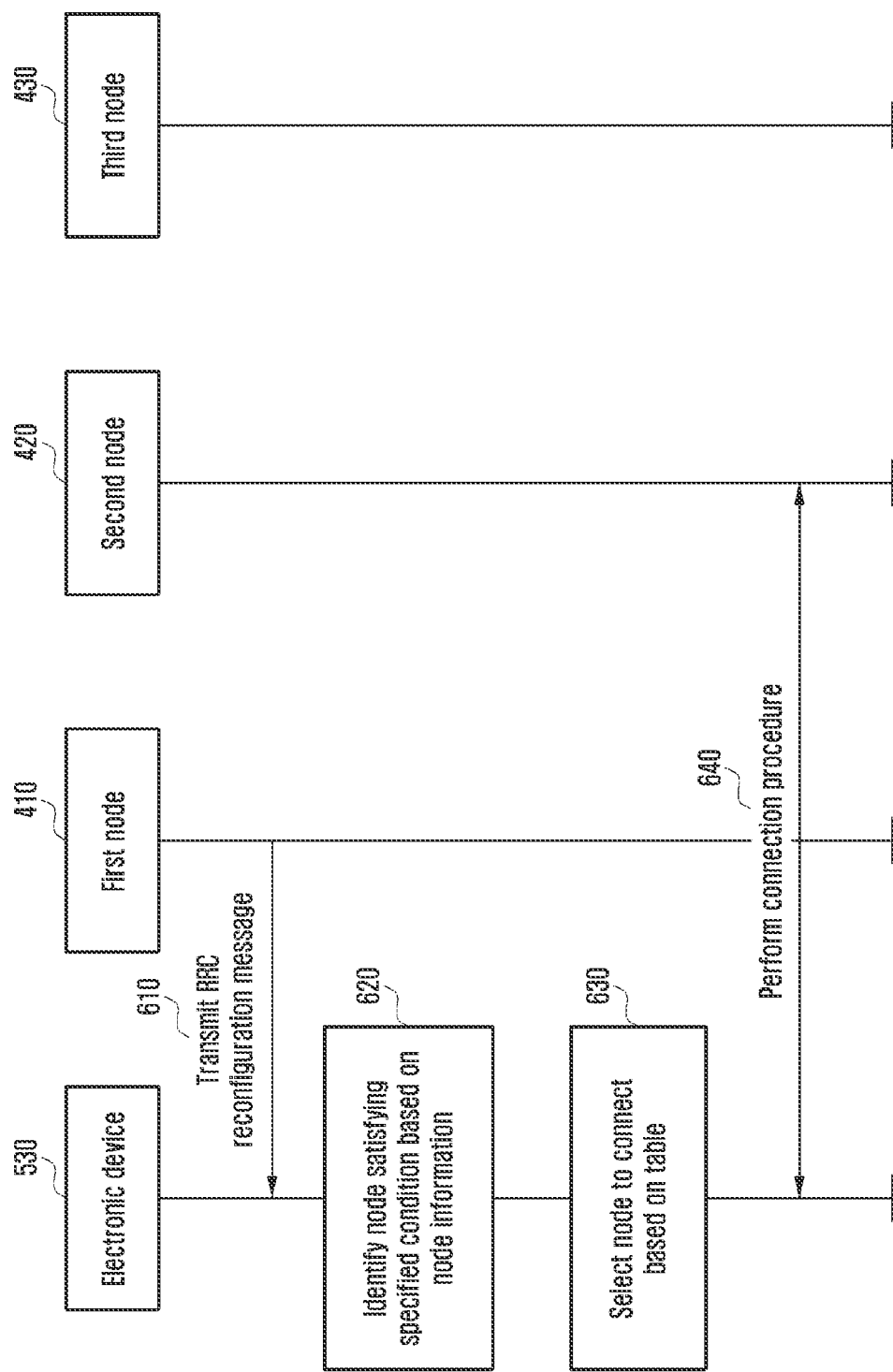
FIG. 6 is a signal flow diagram illustrating an example operation of selecting a node to connect based on information on nodes according to various embodiments.

FIG. 6 is a signal flow diagram illustrating an example operation of selecting a node to connect based on information on nodes according to various embodiments.

A first node (e.g., the first node 410 of FIG. 4) may transmit an RRC reconfiguration message to the electronic device (e.g., the electronic device 500 of FIG. 4) connected to the first node 410 in operation 610.

The RRC reconfiguration message may include information on a node adjacent to the electronic device 500 (or a node adjacent to the first node 410) (e.g., the second node 420 and/or the third node 430). Information on the node adjacent to the electronic device 500 may include conditional handover information. The conditional handover information may include information related to a measurement object (measObject) related to the second node 420 and/or the third node 430, which are/is a node adjacent to the electronic device 500 (or adjacent to the first node 410) and/or information related to a specified condition (or report object) of the measurement result. The measurement object is information required for the electronic device 500 to perform measurement, and may include frequency band information (e.g., channel information) for performing a node search and quality measurement of the found node and/or identification information (e.g., physical cell ID) of a node that outputs a signal of a frequency band included in frequency band information. The specified condition is a condition for reporting the measured quality and may include identification information on an event related to quality reporting (e.g., A3 event, which is a condition in which signal strength of an adjacent node is greater by a specific value or more than that of a connected node, A5 event, which is a condition in which signal strength of a connected node is smaller than a specified magnitude and in which signal strength of an adjacent node is greater than a specified magnitude), a specified threshold related to a quality of the signal transmitted by the node, and/or a time to trigger (TTT) satisfaction of a condition related to the quality.

In operation 620, the electronic device 500 may identify a node satisfying a specified condition based on node information.

In a state in which the electronic device 500 is connected to the first node 410, the electronic device 500 may measure a quality of a signal transmitted by a node adjacent to the electronic device 500 (e.g., the second node 420 and/or the third node 430) included in the conditional handover information and identify whether the quality of the measured signal satisfies a specified condition.

The specified condition may be a condition related to a quality of a signal transmitted by the node. There may be a plurality of nodes satisfying a specified condition included in the conditional handover information. In FIG. 6, for convenience of description, it is assumed that both the second node 420 and the third node 430 satisfy a specified condition included in the conditional handover information.

The electronic device 500 may generate a table based on information on nodes satisfying a specified condition and a type of a service used by the electronic device 500. The table may include data used for determining a node to perform handover.

Information on nodes may be included in conditional handover information, and include information related to a node performance. For example, the node information may refer, for example, to information indicating whether the second node 420 and/or the third node 430 support(s) dynamic spectrum sharing (DSS), information indicating whether the second node 420 and/or the third node 430 support(s) higher order received diversity (HoRXD), information indicating a maximum modulation order supported by the second node 420 and/or the third node 430, the number of maximum multiple input multi output (MIMO) layers supported by the second node 420 and/or the third node 430, information indicating a magnitude of a time allocation resource of a physical downlink shared channel (PDSCH) of the second node 420 and/or the third node 430, and information indicating whether the second node 420 and/or the third node 430 support(s) carrier aggregation (CA) or dual connectivity (e.g., EN-DC, NR-DC).

When generating a table, the electronic device 500 may generate differently a table according to a type of a service being used by itself. The electronic device 500 may select information to be included in the table among node information according to the type of a service being used by itself, and generate a table based on the selected information. When selecting information to be included in the table, the electronic device 500 may select information capable of improving a quality of the service being used. The electronic device 500 may generate a table with reference to information to which a type of a service stored in the memory 530 and information required to generate a table are mapped. Information to be included in the table may include information for improving a quality of the service used by the electronic device 500.

The electronic device 500 may select a node to connect based on the table in operation 630.

The electronic device 500 may determine a node to perform handover with reference to the table. The processor 520 may determine a node to perform handover based on a priority (or weight) of information included in the table.

Referring to FIG. 6, the electronic device 500 may select the second node 420 as a node to perform handover with reference to a table.

In operation 640, the electronic device 500 may perform a connection procedure with the selected node (e.g., the second node 420).

Corresponding to determining a node to perform handover, the electronic device 500 may not transmit a report message including a quality measurement result of the signal transmitted by the determined node to the connected node (e.g., the first node 410) but may perform a handover procedure with the selected node (e.g., the second node 420).

An electronic device according to various example embodiments of the disclosure includes: a memory; a communication circuit configured to transmit and receive data to and from a network; and a communication processor, wherein the communication processor may be configured to: identify information on nodes adjacent to the electronic device included in a radio resource control (RRC) reconfiguration message received from the network; identify at least one node satisfying a specified condition among the nodes; and select a node to connect based on a table generated based on information on nodes satisfying the specified condition and a type of a service used by the electronic device.

In the electronic device according to various example embodiments of the disclosure, the table may be generated differently based on the type of the service.

In the electronic device according to various example embodiments of the disclosure, the communication processor may be configured to select information to be included in the table among information on the nodes based on the type of the service.

In the electronic device according to various example embodiments of the disclosure, the communication processor may be configured to select the node to connect based on a priority of information included in the table.

In the electronic device according to various example embodiments of the disclosure, the priority may be configured differently based on the type of the service.

In an electronic device according to various example embodiments of the disclosure, the communication processor may be configured to: re-generate the table based on a type of the changed service in response to detecting that the service used by the electronic device is changed.

In an electronic device according to various example embodiments of the disclosure, based on identifying that a quality of a signal transmitted by a first node among the nodes is higher by a specified magnitude or more than a quality of signals transmitted by other nodes, the communication processor may be configured to perform a connection between the first node and the electronic device.

An electronic device according to various example embodiments of the disclosure includes a memory; a communication circuit configured to transmit and receive data to and from a network; and a communication processor, wherein the communication processor may be configured to: perform a connection between a first node and the electronic device based on identifying information on nodes adjacent to the electronic device included in a radio resource control (RRC) reconfiguration message received from the network; identifying at least one node satisfying a specified condition among the nodes; identifying whether a quality of a signal transmitted by the first node among the nodes is higher by a specified magnitude or more than a quality of signals transmitted by other nodes; and identifying that a quality of a signal transmitted by the first node is higher by a specified magnitude or more than a quality of signals transmitted by other nodes, and may be configured to select a node to connect based on a table generated based on information on nodes satisfying the specified condition and a type of a service used by the electronic device based on a quality of a signal transmitted by the first node being less by a specified magnitude than a quality of signals transmitted by other nodes.

In the electronic device according to various example embodiments of the disclosure, the table may be generated differently based on the type of the service.

In the electronic device according to various example embodiments of the disclosure, the communication processor may be configured to select information to be included in the table among information on the nodes based on the type of the service.

In the electronic device according to various example embodiments of the disclosure, the communication processor may be configured to select the node to connect based on a priority of information on nodes included in the table.

In the electronic device according to various example embodiments of the disclosure, the priority may be configured differently based on the type of the service.

In the electronic device according to various example embodiments of the disclosure, the communication processor may be configured to re-generate the table based on a type of the changed service based on detecting that the service used by the electronic device is changed.

Figure 7:
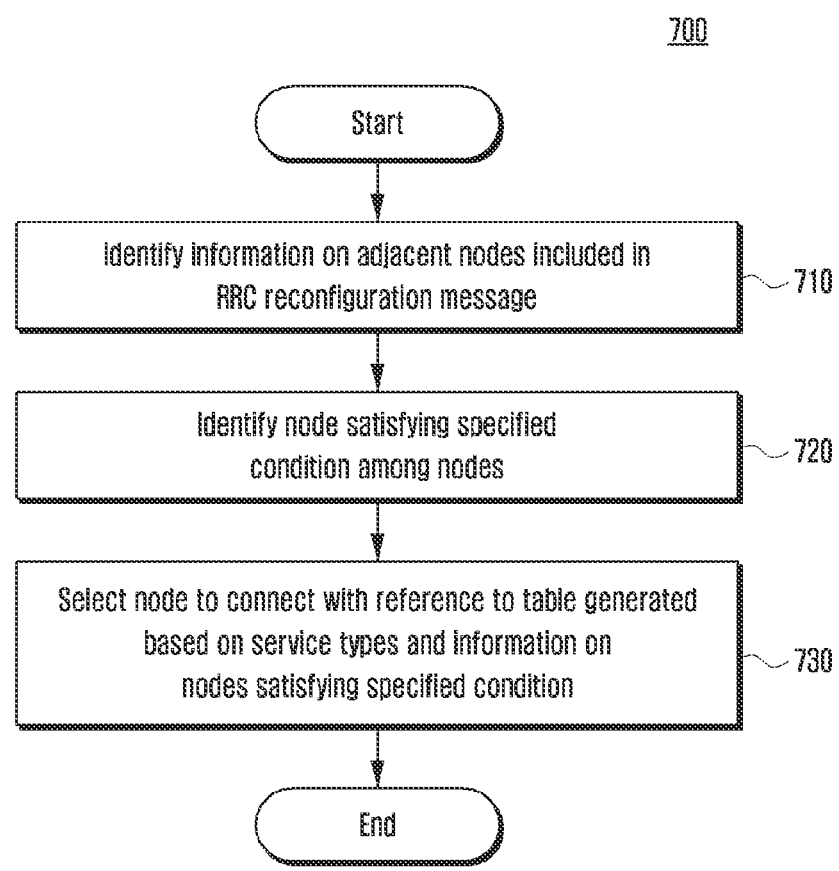
FIG. 7 is a flowchart illustrating an example method of operating an electronic device according to various embodiments.

FIG. 7 is a flowchart illustrating an example method of operating an electronic device according to various embodiments.

The electronic device (e.g., the electronic device 500 of FIG. 5) may identify information on adjacent nodes included in the RRC reconfiguration message in operation 710.

The RRC reconfiguration message may include information on a node adjacent to the electronic device 500 (or a node adjacent to the first node 410) (e.g., the second node 420 and/or the third node 430). Information on the node adjacent to the electronic device 500 may include conditional handover information. The conditional handover information may include information related to a measurement object (measObject) related to the second node 420 and/or the third node 430, which are/is a node adjacent to the electronic device 500 (or adjacent to the first node 410) and/or information related to a specified condition (or report object) of the measurement result. The measurement object is information required for the electronic device 500 to perform measurement, and may include frequency band information (e.g., channel information) for performing a node search and quality measurement of the found node and/or identification information (e.g., physical cell ID) of a node that outputs a signal of a frequency band included in frequency band information. The specified condition is a condition for reporting the measured quality and may include identification information on an event related to quality reporting (e.g., A3 event, which is a condition in which signal strength of an adjacent node is greater by a specific value or more than that of a connected node, A5 event, which is a condition in which signal strength of a connected node is smaller than a specified magnitude and in which signal strength of an adjacent node is greater than a specified magnitude), a specified threshold related to a quality of a signal transmitted by the node, and/or a time to trigger (TTT) satisfaction of a condition related to the quality.

Information on nodes may be included in conditional handover information and include information related to a node performance. For example, the node information may refer, for example, to information indicating whether the second node 420 and/or the third node 430 support(s) dynamic spectrum sharing (DSS), information indicating whether the second node 420 and/or the third node 430 support(s) higher order received diversity (HoRXD), information indicating a maximum modulation order supported by the second node 420 and/or the third node 430, the number of maximum multiple input multi output (MIMO) layers supported by the second node 420 and/or the third node 430, information indicating a magnitude of a time allocation resource of a physical downlink shared channel (PDSCH) of the second node 420 and/or the third node 430, and information indicating whether the second node 420 and/or the third node 430 support(s) carrier aggregation (CA) or dual connectivity (e.g., EN-DC, NR-DC).

In operation 720, the electronic device 500 may identify a node satisfying a specified condition among nodes.

The specified condition is a condition included in the conditional handover information, and may be a condition related to a signal quality. In a state in which the electronic device 500 is connected to the first node 410, the electronic device 500 may measure a quality of a signal transmitted by a node adjacent to the electronic device 500 (e.g., the second node 420 and/or the third node 430) included in the conditional handover information and identify whether the measured signal quality satisfies the specified condition.

According to an embodiment, the processor 520 may control the communication circuit 510 to receive a signal transmitted (or broadcasted) by the second node 420 and to measure a quality of the signal based on identification information of the second node 420 included in the conditional handover information. The processor 520 may identify whether the signal quality of the second node 420 satisfies a specified condition. The specified condition may be included in the conditional handover information. For example, corresponding to identifying that the signal quality of the second node 420 is greater by a specified magnitude (e.g., A3 offset) or more than signal strength of the connected node (e.g., the first node 410), the processor 520 may determine that the signal quality of the second node 420 satisfies a specified condition (e.g., A3 event). For another example, corresponding to identifying that the signal quality of the connected node (e.g., the first node 410) is less than or equal to a specified value (e.g., A5 threshold 1) and that the signal quality of the second node 420 is greater than or equal to a specified value (e.g., A5 threshold 2), the processor 520 may determine that the signal quality of the second node 420 satisfies a specified condition (e.g., A5 event).

According to an embodiment, the electronic device 500 may control the communication circuit 510 to receive a signal transmitted (or broadcasted) by the third node 430 based on identification information of the third node 430 included in the conditional handover information and to measure a quality of the signal. The electronic device 500 may identify whether the signal quality of the third node 430 satisfies a specified condition. The specified condition may be included in the conditional handover information. For example, the electronic device 500 may determine that the signal quality of the third node 430 satisfies a specified condition (e.g., A3 event) corresponding to identifying that the signal quality of the third node 430 is greater by a specified magnitude (e.g., A3 offset) or more than signal strength of the connected node (e.g., the first node 410). As another example, corresponding to identifying that the signal quality of the connected node (e.g., the first node 410) is less than or equal to a specified value (e.g., A5 threshold 1) and that the signal quality of the third node 430 is equal to or greater than a specified value (e.g., A5 threshold 2), the electronic device 500 may determine that the signal quality of the third node 430 satisfies a specified condition (e.g., A5 event).

In operation 730, the electronic device 500 may select a node to connect with reference to (e.g., based on) a table generated based on service types and information on nodes satisfying a specified condition.

The electronic device 500 may generate a table based on information on nodes satisfying a specified condition and a type of a service used by the electronic device 500. The table may include data used for determining a node to perform handover.

When generating a table, the electronic device 500 may generate a table differently according to a type of a service being used by the electronic device 500. The electronic device 500 may select information to be included in the table among node information according to a type of a service being used by itself, and generate a table based on the selected information. When selecting information to be included in the table, the electronic device 500 may select information capable of improving a quality of the service being used. The electronic device 500 may generate a table with reference to information to which a type of the service stored in the memory 530 and information required to generate a table are mapped. Information to be included in the table may include information for improving a quality of a service used by the electronic device 500.

The electronic device 500 may determine (or select) a node to perform handover based on a table generated based on a service type and information on nodes. The electronic device 500 may determine a node to perform handover based on a priority (or weight) of information included in the table.

Following selection of the node in operation 730, the electronic device 500 may perform a connection procedure with the selected node (see, e.g., operation 640 of FIG. 6).

In response to determining a node to perform handover, the electronic device 500 may not transmit a report message including a quality measurement result of a signal transmitted by the determined node to the connected node (e.g., the first node 410) but may perform a connection procedure with the selected node (e.g., the second node 420).

Figure 8:
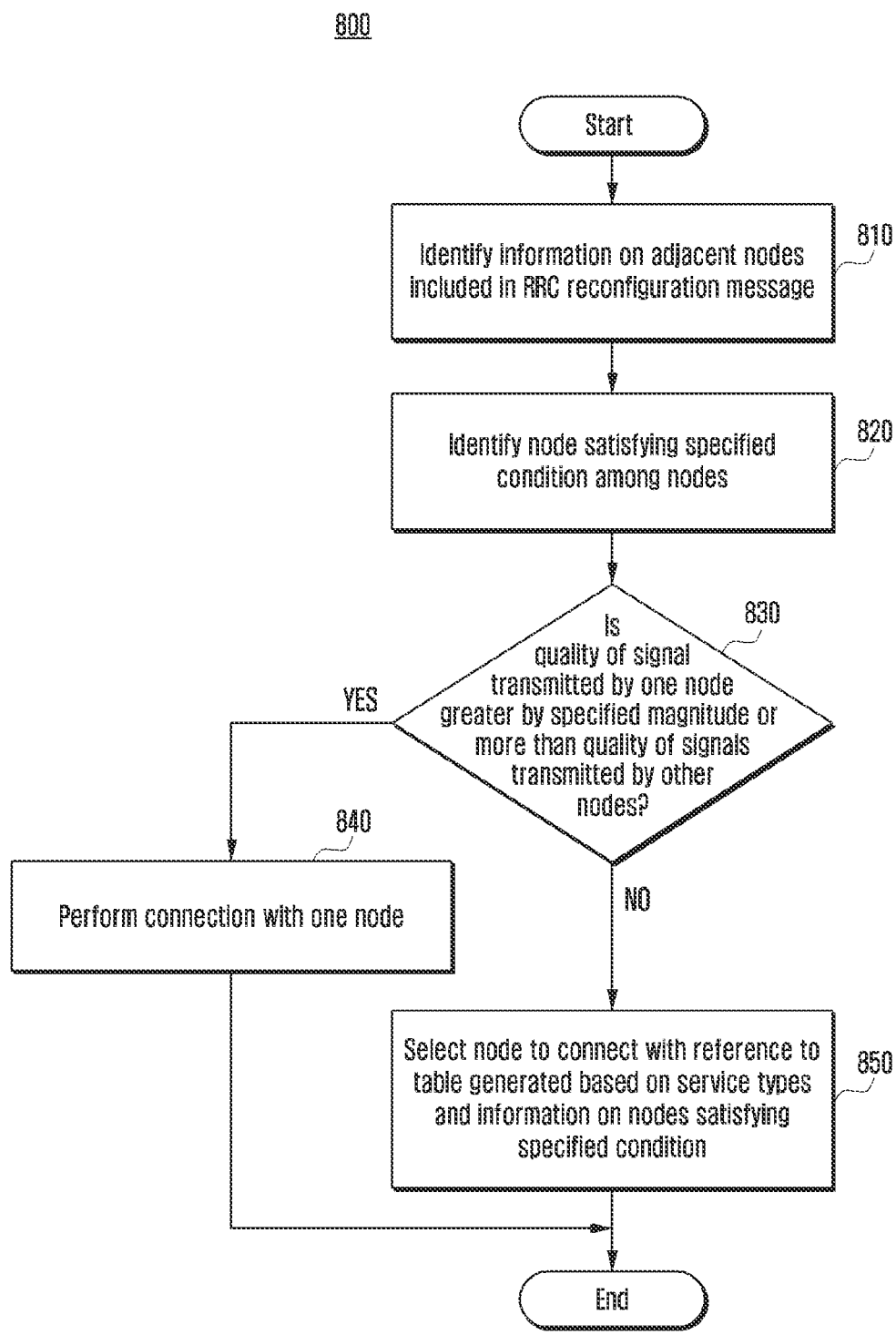
FIG. 8 is a flowchart illustrating an example method of operating an electronic device according to various embodiments.

FIG. 8 is a flowchart illustrating an example method of operating an electronic device according to various embodiments.

The electronic device (e.g., the electronic device 500 of FIG. 5) may identify information on adjacent nodes included in the RRC reconfiguration message in operation 810.

The RRC reconfiguration message may include information on a node adjacent to the electronic device 500 (or a node adjacent to the first node 410) (e.g., the second node 420 and/or the third node 430). Information on the node adjacent to the electronic device 500 may include conditional handover information. The conditional handover information may include information related to a measurement object (measObject) related to the second node 420 and/or the third node 430, which are/is a node adjacent to the electronic device 500 (or adjacent to the first node 410) and/or information related to a specified condition (or report object) of the measurement result. The measurement object is information required for the electronic device 500 to perform measurement, and may include frequency band information (e.g., channel information) for performing a node search and quality measurement of the found node and/or identification information (e.g., physical cell ID) of a node that outputs a signal of a frequency band included in frequency band information. The specified condition is a condition for reporting the measured quality and may include identification information on an event related to quality reporting (e.g., A3 event, which is a condition in which signal strength of an adjacent node is greater by a specific value or more than that of a connected node, A5 event, which is a condition in which signal strength of a connected node is smaller than a specified magnitude and in which signal strength of an adjacent node is greater than a specified magnitude), a specified threshold related to a quality of the signal transmitted by the node, and/or a time to trigger (TTT) satisfaction of a condition related to the quality.

Information on nodes may be included in conditional handover information, and include information related to a node performance. For example, the node information may refer, for example, to information indicating whether the second node 420 and/or the third node 430 support(s) dynamic spectrum sharing (DSS), information indicating whether the second node 420 and/or the third node 430 support(s) higher order received diversity (HoRXD), information indicating a maximum modulation order supported by the second node 420 and/or the third node 430, the number of maximum multiple input multi output (MIMO) layers supported by the second node 420 and/or the third node 430, information indicating a magnitude of a time allocation resource of a physical downlink shared channel (PDSCH) of the second node 420 and/or the third node 430, and information indicating whether the second node 420 and/or the third node 430 support(s) carrier aggregation (CA) or dual connectivity (e.g., EN-DC, NR-DC).

In operation 820, the electronic device 500 may identify a node satisfying a specified condition among nodes.

The specified condition is a condition included in conditional handover information, and may be a condition related to a signal quality. In a state in which the electronic device 500 is connected to the first node 410, the electronic device 500 may measure a quality of a signal transmitted by a node adjacent thereto (e.g., the second node 420 and/or the third node 430) included in the conditional handover information and identify whether the quality of the measured signal satisfies a specified condition.

According to an embodiment, the processor 520 may control the communication circuit 510 to receive a signal transmitted (or broadcast) by the second node 420 and to measure a quality of the signal based on identification information of the second node 420 included in the conditional handover information. The processor 520 may identify whether the signal quality of the second node 420 satisfies a specified condition. The specified condition may be included in the conditional handover information. For example, corresponding to identifying that the signal quality of the second node 420 is greater by a specified magnitude (e.g., A3 offset) or more than signal strength of the connected node (e.g., the first node 410), the processor 520 may determine that the signal quality of the second node 420 satisfies the specified condition (e.g., A3 event). For another example, corresponding to identifying that the signal quality of the connected node (e.g., the first node 410) is equal to or less than a specified value (e.g., A5 threshold 1) and that the signal quality of the second node 420 is greater than or equal to a specified value (e.g., A5 threshold 2), the processor 520 may determine that the signal quality of the second node 420 satisfies the specified condition (e.g., A5 event).

According to an embodiment, the electronic device 500 may control the communication circuit 510 to receive a signal transmitted (or broadcasted) by the third node 430 and to measure the signal quality based on identification information of the third node 430 included in the conditional handover information. The electronic device 500 may identify whether the signal quality of the third node 430 satisfies a specified condition. The specified condition may be included in the conditional handover information. For example, corresponding to identifying that the signal quality of the third node 430 is greater by a specified magnitude (e.g., A3 offset) or more than signal strength of the connected node (e.g., the first node 410), the electronic device 500 may determine that the signal quality of the third node 430 satisfies the specified condition (e.g., A3 event). As another example, corresponding to identifying that the signal quality of the connected node (e.g., the first node 410) is less than or equal to a specified value (e.g., A5 threshold 1) and that the signal quality of the third node 430 is equal to or greater than a specified value (e.g., A5 threshold 2), the electronic device 500 may determine that the signal quality of the third node 430 satisfies the specified condition (e.g., A5 event).

In operation 830, the electronic device 500 may identify whether a quality of a signal transmitted by one node of the plurality of nodes is greater by a specified magnitude (e.g., 3 dB) or more than a quality of signals transmitted by other nodes.

In operation 840, in response to identifying that a signal quality of one node of a plurality of nodes is greater by a specified magnitude or more than a signal quality of the other node (operation 830-Y), the electronic device 500 may determine a node with the best signal quality as a node to perform handover and perform connection with the determined node.

In operation 850, corresponding to identifying that a signal quality of one node of a plurality of nodes is not greater by a specified magnitude or more than a signal quality of the other node (operation 830-N), the electronic device 500 may select a node to connect with reference to a table generated based on service types and information on nodes satisfying the specified condition.

The electronic device 500 may generate a table based on information on nodes satisfying a specified condition and a type of a service used by the electronic device 500. The table may include data used for determining a node to perform handover.

When generating a table, the electronic device 500 may generate a table differently according to a type of a service being used by itself. The electronic device 500 may select information to be included in the table among node information according to a type of a service being used by itself, and generate a table based on the selected information. When selecting information to be included in the table, the electronic device 500 may select information capable of improving a quality of a service being used. The electronic device 500 may generate a table with reference to information to which a type of a service stored in the memory 530 and information required to generate a table are mapped. Information to be included in the table may include information for improving a quality of a service used by the electronic device 500.

The electronic device 500 may determine (or select) a node to perform handover based on a table generated based on node information and a service type. The electronic device 500 may determine a node to perform handover based on a priority (or weight) of information included in the table.

Following selection of the node in operation 730, the electronic device 500 may perform a connection procedure with the selected node (see, e.g., operation 640 of FIG. 6).

Corresponding to determining a node to perform handover, the electronic device 500 may not transmit a report message including a quality measurement result of a signal transmitted by the determined node to the connected node (e.g., the first node 410) but may perform a connection procedure with the selected node (e.g., the second node 420).

A method of operating an electronic device according to various example embodiments of the disclosure may include: identifying information on nodes adjacent to the electronic device included in a radio resource control (RRC) reconfiguration message received from a network; identifying at least one node satisfying a specified condition among the nodes; and selecting a node to connect based on a table generated based on information on nodes satisfying the specified condition and a type of a service used by the electronic device.

In the method of operating an electronic device according to various example embodiments of the disclosure, the table may be generated differently based on a type of the service.

A method of operating an electronic device according to various example embodiments of the disclosure may further include: selecting information to be included in the table among information on the nodes based on the type of the service; and generating the table based on the selected information.

In the method of operating an electronic device according to various example embodiments of the disclosure, selecting a node to connect may include selecting a node to connect based on a priority of information included in the table.

In the method of operating an electronic device according to various example embodiments of the disclosure, the priority may be configured differently based on the type of the service.

The method of operating an electronic device according to various example embodiments of the disclosure may further include re-generating the table based on a type of the changed service in response to detecting that the service used by the electronic device is changed.

The method of operating an electronic device according to various example embodiments of the disclosure may further include performing a connection between a first node and the electronic device in response to identifying that a quality of a signal transmitted by the first node among the nodes is higher by a specified magnitude or more than a quality of signals transmitted by other nodes.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art, that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An user equipment, comprising:
  memory;
  a communication circuit configured to transmit and receive data to and from a network; and
  a communication processor including processing circuitry and connected to the memory and the communication circuit,
  wherein the communication processor is configured to:
    identify information on nodes adjacent to the user equipment included in a radio resource control (RRC) reconfiguration message received from the network, wherein the information on the nodes adjacent to the user equipment includes at least one condition of execution of conditional handover and information related to performance of each of the nodes adjacent to the user equipment;
    identify at least one or more nodes among the nodes adjacent to the user equipment, the at least one or more nodes satisfying the at least one condition of the execution of the conditional handover;
    identify information related to the performance of the identified at least one or more nodes satisfying the at least one condition of the execution of the conditional handover from the RRC reconfiguration message; and
    select a node to perform the conditional handover among the at least one or more nodes based on RSRP of each of the at least one or more nodes, a type of service being performed by the user equipment and the information related to the performance of the identified at least one or more nodes satisfying the at least one condition of the execution of the conditional handover.

2. The user equipment of claim 1, wherein the communication processor is further configured to
select the node to perform the conditional handover among the at least one or more nodes based on a table, the table being generated based on the information related to the performance of the identified at least one or more nodes satisfying the at least one condition of the execution of the conditional handover and the type of the service being performed by the user equipment, wherein the table includes information related to performance of the at least one or more nodes satisfying the at least one condition of the execution of the conditional handover and is generated differently based on the type of the service.

3. The user equipment of claim 2, wherein the communication processor is configured to select information to be included in the table among information related to the performance of each of the nodes adjacent to the user equipment based on the type of the service.

4. The user equipment of claim 3, wherein the communication processor is configured to select a node to connect based on a priority of the information included in the table.

5. The user equipment of claim 4, wherein the priority is differently configured based on the type of the service.

6. The user equipment of claim 2, wherein the communication processor is configured to re-generate the table based on a type of the changed service in response to detecting that the service used by the user equipment is changed.

7. The user equipment of claim 2, wherein the table excludes information related to performance of at least one or more nodes being not satisfied the at least one condition of the execution of the conditional handover.

8. An user equipment, comprising:
a memory;
a communication circuit configured to transmit and receive data to and from a network; and
a communication processor,
wherein the communication processor is configured to:
identify information on nodes adjacent to the user equipment included in a radio resource control (RRC) reconfiguration message received from the network, wherein the information on the nodes adjacent to the user equipment includes at least one condition of execution of conditional handover and information related to performance of each of the nodes adjacent to the user equipment;
identify at least one or more nodes among the nodes adjacent to the user equipment satisfying the at least one condition of the execution of the conditional handover;
identify whether a quality of a signal transmitted by a first node among the nodes is higher by a specified magnitude or more than a quality of signals transmitted by other nodes;
perform the conditional handover to the first node based on identifying that the quality of the signal transmitted by the first node is higher by a specified magnitude or more than the quality of signals transmitted by other nodes,
identify information related to the performance of the identified at least one or more nodes satisfying the at least one condition of the execution of the conditional handover from the RRC reconfiguration message based on identifying that the quality of a signal transmitted by the first node is less by a specified magnitude than that of signals transmitted by other nodes,
select a node to perform the conditional handover among the at least one or more nodes based on RSRP of each of the at least one or more nodes, a type of service being performed by the user equipment and the information related to the performance of the identified at least one or more nodes satisfying the at least one condition of the execution of the conditional handover.

9. The user equipment of claim 8, wherein the communication processor is further configured to:
select the node to perform the conditional handover among the at least one or more nodes based on a table, the table being generated based on the information related to the performance of the identified at least one or more node satisfying the at least one condition of the execution of the conditional handover and the type of the service being performed by the user equipment, wherein the table includes information related to performance of the at least one or more nodes satisfying the at least one condition of the execution of the conditional handover and is generated differently based on the type of the service.

10. The user equipment of claim 9, wherein the communication processor is configured to select information to be included in the table among information related to the performance of each of the nodes adjacent to the user equipment based on the type of the service.

11. The user equipment of claim 10, wherein the communication processor is configured to select a node to connect based on a priority of information on nodes included in the table.

12. The user equipment of claim 11, wherein the priority is differently configured based on the type of the service.

13. The user equipment of claim 9, wherein the communication processor is configured to re-generate the table based on a type of the changed service in response to detecting that the service used by the user equipment is changed.

14. A method of operating an user equipment, the method comprising:
identifying information on nodes adjacent to the user equipment included in a radio resource control (RRC) reconfiguration message received from a network, wherein the information on the nodes includes at least one condition of execution of conditional handover and information related to performance of each of the nodes adjacent to the user equipment;
identifying at least one or more nodes satisfying the at least one condition of the execution of the conditional handover;
identifying information related to the performance of the identified at least one or more nodes satisfying the at least one condition of the execution of the conditional handover from the RRC reconfiguration message; and
selecting a node to perform the conditional handover among the at least one or more nodes based on RSRP of each of the at least one or more nodes, a type of service being performed by the user equipment and the information related to the performance of the identified at least one or more nodes satisfying the at least one condition of the execution of the conditional handover.

15. The method of claim 14, further comprising:
selecting the node to perform the conditional handover among the at least one or more nodes based on a table, the table being generated based on the information related to the performance of the identified at least one or more satisfying nodes the at least one condition of the execution of the conditional handover and the type of the service being performed by the user equipment,
wherein the table includes information related to performance of the at least one or more nodes satisfying the at least one condition of the execution of the conditional handover and is generated differently based on the type of the service.

16. The method of claim 15, further comprising:
selecting information to be included in the table among information related to the performance of each of the nodes adjacent to the user equipment based on the type of the service; and
generating the table based on the selected information.

17. The method of claim 16, wherein selecting a node to connect comprises selecting a node to connect based on a priority of information included in the table.

18. The method of claim 17, wherein the priority is configured differently based on the type of the service.

19. The method of claim 15, further comprising re-generating the table based on a type of the changed service in response to detecting that the service used by the user equipment is changed.

20. The method of claim 15, wherein the table excludes information related to performance of at least one or more nodes being not satisfied the at least one condition of the execution of the conditional handover.

\* \* \* \* \*